(12) United States Patent
Sprenger et al.

(10) Patent No.: US 10,575,048 B2
(45) Date of Patent: Feb. 25, 2020

(54) MEDIA PLAYER WITH INTEGRATED WIRELESS VIDEO LINK CAPABILITY AND METHOD AND SYSTEM FOR IMPLEMENTING VIDEO TUNING AND WIRELESS VIDEO COMMUNICATION

(71) Applicant: CenturyLink Intellectual Property LLC, Denver, CO (US)

(72) Inventors: Michael D. Sprenger, Boulder, CO (US); Zubin Ingah, Centennial, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 35 days.

(21) Appl. No.: 15/785,211

(22) Filed: Oct. 16, 2017

(65) Prior Publication Data

US 2018/0167670 A1    Jun. 14, 2018

Related U.S. Application Data

(60) Provisional application No. 62/431,982, filed on Dec. 9, 2016.

(51) Int. Cl.
| | |
|---|---|
| *H04N 21/4363* | (2011.01) |
| *H04N 21/426* | (2011.01) |
| *H04N 21/4367* | (2011.01) |
| *H04N 21/436* | (2011.01) |
| *H04N 21/422* | (2011.01) |
| *H04W 76/02* | (2009.01) |
| *H04W 76/10* | (2018.01) |
| *H04N 21/41* | (2011.01) |

(52) U.S. Cl.
CPC ... *H04N 21/43637* (2013.01); *H04N 21/4122* (2013.01); *H04N 21/4222* (2013.01); *H04N 21/4263* (2013.01); *H04N 21/42203* (2013.01); *H04N 21/4367* (2013.01); *H04N 21/43615* (2013.01); *H04W 76/10* (2018.02)

(58) Field of Classification Search
CPC ........... H04N 21/422; H04N 21/42203; H04N 21/4222; H04N 21/426; H04N 21/4263; H04N 21/436; H04N 21/43615; H04N 21/4363; H04N 21/43637; H04N 21/4367
See application file for complete search history.

(56) References Cited

U.S. PATENT DOCUMENTS

| | | | |
|---|---|---|---|
| 2012/0030719 A1* | 2/2012 | Lim .................... | H04N 1/00281 725/81 |
| 2016/0034245 A1* | 2/2016 | Karunakaran ........ | G06F 3/1454 345/2.2 |
| 2016/0373810 A1* | 12/2016 | Ansari ............... | H04N 21/4122 |

* cited by examiner

*Primary Examiner* — Rong Le

(57) ABSTRACT

Novel tools and techniques are provided for implementing media content streaming or playback, and, more particularly, for implementing video tuning and wireless video communication. In various embodiments, a media player, which might include an integrated wireless video link system, might receive an encoded video signal from a media content source(s) (and/or a corresponding database(s)). The media player might decode the received video signal, might establish a wireless communications link between the media player and one or more display devices via the integrated wireless video link system, and might send the decoded video signal to the one or more display devices (and/or one or more user devices) via the wireless communications link established by the integrated wireless video link system. In some cases, the media player might perform one or more of these processed in response to user input received via the user devices or via the media player's user interface(s).

19 Claims, 6 Drawing Sheets

MEDIA PLAYER WITH INTEGRATED WIRELESS VIDEO LINK CAPABILITY AND METHOD AND SYSTEM FOR IMPLEMENTING VIDEO TUNING AND WIRELESS VIDEO COMMUNICATION

CROSS-REFERENCES TO RELATED APPLICATIONS

This application claims priority to U.S. Patent Application Ser. No. 62/431,982 (the "'982 Application"), filed on Dec. 9, 2016 by Michael D. Sprenger et al., entitled, "Media Player with Integrated Wireless Video Link," the disclosure of which is incorporated herein by reference in its entirety for all purposes.

This application may be related to U.S. patent application Ser. No. 15/477,356 (the "'356 Application"), filed on Apr. 3, 2017 by Michael D. Sprenger et al., entitled, "Video Quality Optimization Based on Display Capabilities," which claims priority to U.S. Patent Application Ser. No. 62/395,507 (the "'507 Application"), filed on Sep. 16, 2016 by Michael D. Sprenger et al., entitled, "Video Quality Optimization Based on Display Capabilities," the disclosures of both of which are incorporated herein by reference in their entirety for all purposes. This application may also be related to U.S. patent application Ser. No. 15/477,376 (the "'376 Application"), filed on Apr. 3, 2017 by Zubin Ingah et al., entitled, "Method and System for Implementing Content Navigation or Selection Using Touch-based Input," which claims priority to U.S. Patent Application Ser. No. 62/403,843 (the "'843 Application"), filed on Oct. 4, 2016 by Zubin Ingah et al., entitled, "Novel Mechanism for Content Selection Using Touchscreen or Touchpad," the disclosures of both of which are incorporated herein by reference in their entirety for all purposes. This application may also be related to U.S. patent application Ser. No. 15/785,145 (the "'145 Application"), filed on Oct. 16, 2017 by Michael D. Sprenger et al., entitled, "Method and System for Implementing Detection and Visual Enhancement of Video Encoding Artifacts," which claims priority to U.S. Patent Application Ser. No. 62/429,493 (the "'493 Application"), filed on Dec. 2, 2016 by Michael D. Sprenger et al., entitled, "Detection and Visual Enhancement of Video Encoding Artifacts," the disclosures of both of which are incorporated herein by reference in their entirety for all purposes. This application may also be related to U.S. patent application Ser. No. 15/785,185 (the "'185 Application"), filed on Oct. 16, 2017, by Michael D. Sprenger et al., entitled, "Method and System for Implementing Media Stream Synchronization," which claims priority to U.S. Patent Application Ser. No. 62/520,249 (the "'249 Application"), filed on Jun. 15, 2017 by Michael D. Sprenger et al., entitled, "Novel Method for Media Stream Synchronization," the disclosures of both of which are incorporated herein by reference in their entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing media content streaming or playback, and, more particularly, to methods, systems, and apparatuses for implementing video tuning and wireless video communication using a single device in which these functionalities are integrated.

BACKGROUND

Currently, there exist devices that offer wireless video link technology. Such wireless video link technology may include a standalone point-to-point link from dedicated wireless video link device to a television or projector. These, however, require the player to be connected to the wireless video transmitter, using a cable such as high definition multimedia interface ("HDMI") devices or the like. Such devices, however, do not combine wireless video link technology with audio and/or video media playing capabilities all integrated within a single device. Alternatively, such wireless video link technology may include an input switching capability (various analog & digital audio and/or video protocols) combined with wireless video link technology. Such devices also do not combine wireless video link technology with audio and/or video media playing capabilities all integrated within a single device.

Hence, there is a need for more robust and scalable solutions for implementing media content streaming or playback, and, more particularly, to methods, systems, and apparatuses for implementing video tuning and wireless video communication using a single device in which these functionalities are integrated.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
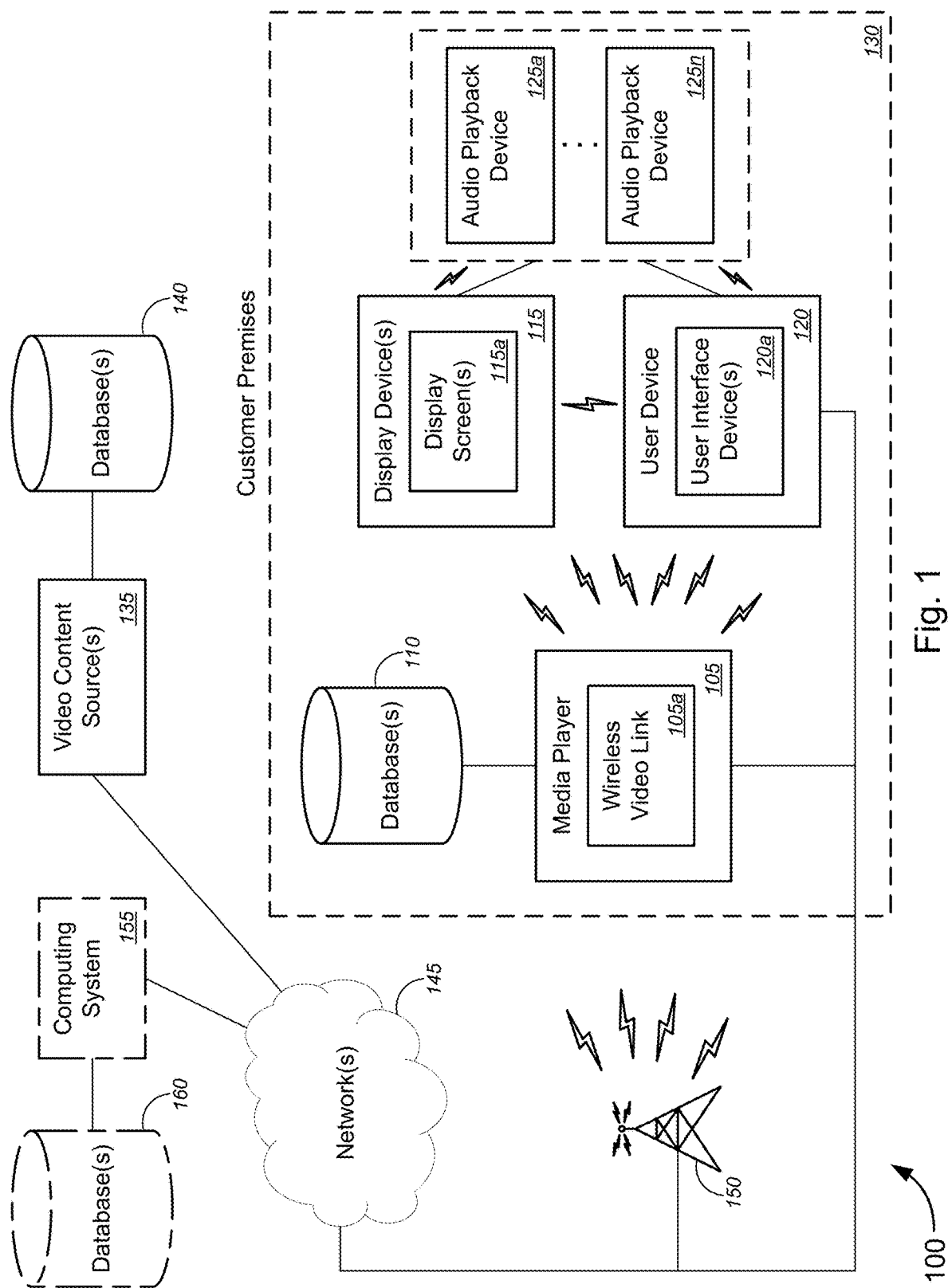
FIG. 1 is a schematic diagram illustrating a system for implementing video tuning and wireless video communication using a single device in which these functionalities are integrated, in accordance with various embodiments.

Various embodiments provide tools and techniques for implementing media content streaming or playback, and, more particularly, to methods, systems, and apparatuses for implementing video tuning and wireless video communication using a single device in which these functionalities are integrated.

In various embodiments, a media player, which might include a wireless video link system that is integrated within the media player, might receive an encoded video signal from a media content source(s) (and/or a corresponding database(s). The media player might decode the received video signal, might establish a wireless communications link between the media player and one or more display devices via the integrated wireless video link system, and might send the decoded video signal to the one or more display devices (and/or one or more user devices) via the wireless communications link established by the integrated wireless video link system. In some cases, the media player might perform at least one of the decoding of the video signal, the establishment of the wireless communications link, and/or the sending of the decoded video signal in response to user input received via the user devices or via the media player's user interface(s).

According to some embodiments, sending the decoded video signal to the one or more display devices via the wireless communications link established by the integrated wireless video link system might comprise sending the decoded video signal to the one or more display devices, via the wireless communications link established by the integrated wireless video link system, using a wireless video link protocol comprising at least one of WirelessHD protocol, Wireless Home Digital Interface ("WHDI") protocol, or Wireless Gigabit Alliance ("WiGig") protocol, and/or the like.

In some embodiments, the media player might receive user input from a user. In some cases, at least one of decoding the received video signal, establishing the wireless communications link between the media player and the one or more display devices via the integrated wireless video link system, or sending the decoded video signal to the one or more display devices via the wireless communications link, and/or the like might be performed in response to receiving the user input. In some instances, the user input might include, without limitation, at least one of voice input via a voice interface device, remote control input via a remote controller, or user interface input via a user interface device that is integrated in the media player, and/or the like. According to some embodiments, the user input might be received from a user device, which includes, but is not limited to, one of a laptop computer, a tablet computer, a smart phone, a mobile phone, a personal digital assistant, a remote control device, or a portable gaming device, and/or the like.

In sum, the various embodiments provide a media player that integrates the functionalities of video tuning and wireless video communication within a single device, the various embodiments further providing the corresponding method and system. Further advantages of such an integrated single device include, without limitation, minimized set-up times for the media player. For example, a service provider is able to offer services to consumers both inside and outside its main serving areas, shipping customer premises equipment ("CPE"; e.g., set-top box, or the like) directly to a customer and enabling the customer to connect the CPE to his or her TV(s) without restrictions associated with CPE placement (e.g., near the TV(s), or in line of sight of the TV(s), etc.). The customer is also relieved from the tedious task of figuring out how to connect cables between the CPE and the TV(s), as the wireless only set-up precludes such steps. Further, technicians need not be sent out to install the CPE in the customer's home or office because set-up can be handled wirelessly (and in some cases, remotely from a central office or the like, if at all necessary).

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, media content streaming or downloading technology, wireless video communication technology, and/or the like. In other aspects, certain embodiments, can improve the functioning of user equipment or systems themselves (e.g., media players, set-top boxes ("STBs"), media content streaming or downloading systems, etc.), for example, by using a single device (in the form of a media player) to receive an encoded video signal from a media content source, to decode the received video signal, to establish a wireless communications link between the media player and one or more display devices via a wireless video link system that is integrated within the media player, and to send the decoded video signal to the one or more display devices via the wireless communications link established by the integrated wireless video link system, and/or the like. In particular, to the extent any abstract concepts are present in the various embodiments, those concepts can be implemented as described herein by devices, software, systems, and methods that involve specific novel functionality (e.g., steps or operations), such as, using a single device (in the form of a media player) to receive an encoded video signal from a media content source, to decode the received video signal, to establish a wireless communications link between the media player and one or more display devices via a wireless video link system that is integrated within the media player, and to send the decoded video signal to the one or more display devices via the wireless communications link established by the integrated wireless video link system, and/or the like, which optimizes decoding and presentation of the media content (particularly video content) thus providing for smoother and more efficient presentation of video content to the user, and minimizes setup time for the media player, and/or the like, to name a few examples, that extend beyond mere conventional computer processing operations. These functionalities can produce tangible results outside of the implementing computer system, including, merely by way of example, optimized decoding and presentation of media content (particularly, video content) to the user thus providing for smoother and more efficient presentation of video content to the user, and minimizes setup time for the media player, and/or the like, at least some of which may be observed or measured by customers and/or service providers.

In an aspect, a method might comprise receiving, with a media player comprising an integrated wireless video link system, an encoded video signal from a media content source; decoding, with the media player, the received video signal; establishing, with the media player, a wireless communications link between the media player and one or more display devices via the integrated wireless video link system; and sending, with the media player, the decoded video signal to the one or more display devices via the wireless communications link established by the integrated wireless video link system.

In some embodiments, sending the decoded video signal to the one or more display devices via the wireless communications link established by the integrated wireless video link system might comprise sending, with the media player, the decoded video signal to the one or more display devices, via the wireless communications link established by the integrated wireless video link system, using a wireless video link protocol comprising at least one of WirelessHD protocol, Wireless Home Digital Interface ("WHDI") protocol, or Wireless Gigabit Alliance ("WiGig") protocol, and/or the like.

According to some embodiments, establishing a wireless communications link between the media player and one or more display devices via the integrated wireless video link system might comprise establishing, with the media player, a secure wireless communications link between the media player and one or more display devices via the integrated wireless video link system, the secure wireless communications link allowing only the one or more display devices to receive the decoded video signal.

Merely by way of example, in some cases, the media player comprises one of a set-top box ("STB"), a digital video recording ("DVR") device, a user device, a server computer over a network, a cloud-based computing system over a network, or a gaming console, and/or the like. In some instances, the one or more display devices might each comprise one of a television set, a smart television, a video projection system, a computer monitor, or a laptop monitor, and/or the like.

In some embodiments, the method might further comprise receiving, with the media player, user input from a user. In some cases, at least one of decoding the received video signal, establishing the wireless communications link between the media player and the one or more display devices via the integrated wireless video link system, or sending the decoded video signal to the one or more display devices via the wireless communications link might be performed in response to receiving the user input. According to some embodiments, the user input might comprise at least one of voice input via a voice interface device, remote control input via a remote controller, or user interface input via a user interface device that is integrated in the media player, and/or the like. In some instances, the user input might be received from a user device comprising one of a laptop computer, a tablet computer, a smart phone, a mobile phone, a personal digital assistant, a remote control device, or a portable gaming device, and/or the like.

In another aspect, a media player might comprise an integrated wireless video link system; at least one processor; and a non-transitory computer readable medium communicatively coupled to the at least one processor. The non-transitory computer readable medium might have stored thereon computer software comprising a set of instructions that, when executed by the at least one processor, causes the media player to: receive, with the integrated wireless video link system, an encoded video signal from a media content source; decode the received video signal; establish a wireless communications link between the media player and one or more display devices via the integrated wireless video link system; and send the decoded video signal to the one or more display devices via the wireless communications link established by the integrated wireless video link system.

According to some embodiments, sending the decoded video signal to the one or more display devices via the wireless communications link established by the integrated wireless video link system might comprise sending the decoded video signal to the one or more display devices, via the wireless communications link established by the integrated wireless video link system, using a wireless video link protocol comprising at least one of WirelessHD protocol, Wireless Home Digital Interface ("WHDI") protocol, or Wireless Gigabit Alliance ("WiGig") protocol, and/or the like. In some cases, the media player might comprise one of a set-top box, a digital video recording ("DVR") device, a user device, a server computer over a network, a cloud-based computing system over a network, or a gaming console, and/or the like. In some instances, the one or more display devices might each comprise one of a television set, a smart television, a video projection system, a computer monitor, or a laptop monitor, and/or the like.

In some embodiments, the media player might further comprise a user interface device. The set of instructions, when executed by the at least one processor, might further cause the media player to receive, with the user interface device, user input from a user. In some instances, at least one of decoding the received video signal, establishing the wireless communications link between the media player and the one or more display devices via the integrated wireless video link system, or sending the decoded video signal to the one or more display devices via the wireless communications link might be performed in response to receiving the user input. According to some embodiments, the user input might comprise at least one of voice input via a voice interface device, remote control input via a remote controller, or user interface input via the user interface device that is integrated in the media player, and/or the like. In some cases, the user input might be received by the user interface device from a user device comprising one of a laptop computer, a tablet computer, a smart phone, a mobile phone, a personal digital assistant, a remote control device, or a portable gaming device, and/or the like.

In yet another aspect, a system might comprise a media player and one or more display devices. The media player might comprise an integrated wireless video link system; at least one first processor; and a first non-transitory computer readable medium communicatively coupled to the at least one first processor. The first non-transitory computer readable medium might have stored thereon computer software comprising a first set of instructions that, when executed by the at least one first processor, causes the media player to: receive, with the integrated wireless video link system, an encoded video signal from a media content source; decode the received video signal; establish a wireless communications link between the media player and the one or more display devices via the integrated wireless video link system; and send the decoded video signal to the one or more display devices via the wireless communications link established by the integrated wireless video link system.

Each of the one or more display devices might comprise a first wireless communications system; one or more display screens; at least one second processor; and a second non-transitory computer readable medium communicatively coupled to the at least one second processor. The second non-transitory computer readable medium might have stored thereon computer software comprising a second set of instructions that, when executed by the at least one second processor, causes the display device to: receive, via the first wireless communications system, the decoded video signal sent from the media player; and display, on the one or more display screens, the received and decoded video signal.

In some cases, the media player might comprise one of a set-top box, a digital video recording ("DVR") device, a user device, a server computer over a network, a cloud-based computing system over a network, or a gaming console, and/or the like. In some instances, the one or more display devices might each comprise one of a television set, a smart television, a video projection system, a computer monitor, or a laptop monitor, and/or the like.

According to some embodiments, the media player might further comprise a first user interface device. The set of instructions, when executed by the at least one first processor, might further cause the media player to receive, with the first user interface device, user input from a user.

In some embodiments, the system might comprise a user device, which might comprise a second wireless communications system; a second user interface device; at least one third processor; and a third non-transitory computer readable medium communicatively coupled to the at least one third processor. The third non-transitory computer readable medium might have stored thereon computer software comprising a third set of instructions that, when executed by the at least one third processor, causes the user device to: receive, via the second user interface device, user input from a user; generate one or more command instructions based on the received user input; and send, via the second wireless communications system, the generated one or more command instructions to the media player. In some instances, the user device might comprise one of a laptop computer, a tablet computer, a smart phone, a mobile phone, a personal digital assistant, a remote control device, or a portable gaming device, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing media content streaming or playback, and, more particularly, to methods, systems, and apparatuses for implementing video tuning and wireless video communication using a single device in which these functionalities are integrated, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing video tuning and wireless video communication using a single device in which these functionalities are integrated, in accordance with various embodiments.

In the non-limiting embodiment of FIG. 1, system 100 might comprise a media player 105, which might comprise an integrated wireless video link system 105*a*, and a data store(s) or database(s) 110 that is local to the media player 105. In some cases, the database(s) 110 might be external, yet communicatively coupled, to the media player 105. In other cases, the database(s) 110 might be integrated within the media player 105. System 100, according to some embodiments, might further comprise one or more display devices 115 (collectively, "display devices 115" or the like), which might each include a display screen(s) 115*a*, and one or more user devices 120 (collectively, "user devices 120" or the like), which might each include a user interface device(s) 120*a*, and/or the like. In some embodiments, the user interface device(s) 120*a* might include, but is not limited to, at least one of a touchscreen display(s) or touchscreen display device(s), one or more physical actuators (e.g., buttons, switches, toggles, etc.), one or more virtual actuators (e.g., touchscreen buttons, switches, toggles, slide-bars, etc.), one or more voice interface devices, a gesture interface device(s), a remote control interface device(s), and/or the like. In some cases, system 100 might further, or optionally, comprise one or more audio playback devices 125*a*-125*n* (collectively, "audio playback devices 125" or "speakers 125" or the like), and/or the like.

The media player 105 might communicatively couple to each of the one or more display devices 115 and/or the one or more user devices 120 (and, in some cases, to one or more of the audio playback devices 125*a*-125*n*, or the like) via wireless connection, via the integrated wireless video link system 105*a*. Each of the one or more display devices 115 and/or the one or more user devices 120 might communicatively couple to one or more of the audio playback devices 125a-125n, and/or to each other, either via wireless connection and/or via wired connection. The one or more user devices 120 might each receive user input from a user (in various embodiments, receiving touch input from the user via a touchscreen display; in some embodiments, receiving voice input from the user via a voice interface device; in some instances, receiving gesture input from the user via a gesture interface device; in some cases, receiving physical user input from the user via one or more physical actuators, or the like; according to some embodiments, receiving remote control input via a remote control interface device; etc.), and might each relay the user input to the media player 105, according to some embodiments.

In some cases, the user devices 120 might include, without limitation, at least one of a dedicated remote control device (with touchscreen display and/or other user interface device) that is associated with the media player 105, a universal remote control device (with touchscreen display and/or other user interface device) that has been paired, synced, or synchronized with the media player 105, a tablet computer that has been paired, synced, or synchronized with the media player 105, a smart phone that has been paired, synced, or synchronized with the media player 105, or other portable device (with touchscreen display and/or other user interface device) that has been paired, synced, or synchronized with the media player 105, and/or the like. In some cases, the media player 105, the database(s) 110, the one or more display devices 115 (including the display screen(s) 115a and/or the audio playback device(s) 125, etc.), and the user device(s) 120 may be disposed within a customer premises 130, which might be one of a single family house, a multi-dwelling unit ("MDU") within a multi-dwelling complex (including, but not limited to, an apartment building, an apartment complex, a condominium complex, a townhouse complex, a mixed-use building, etc.), a motel, an inn, a hotel, an office building or complex, a commercial building or complex, an industrial building or complex, and/or the like.

In some embodiments, the media player 105 might comprise one of a processor on the display device running a software application ("app"), a processor on the user device running an app, a media player, and/or the like. In some cases, the media device might include, but is not limited to, one of a set-top box ("STB"), a media player, a gaming console, a server computer, a desktop computer, or a laptop computer, and/or the like. The media player might include, without limitation, one of a digital versatile disc or digital video disc ("DVD") player, a Blu-ray disc ("BD") player, a digital video recording ("DVR") device, a streaming video player, a streaming music player, or a streaming game player, and/or the like, while the one or more display devices 115 might include, but are not limited to, at least one of one or more monitors (e.g., computer monitor or laptop monitor, or the like), one or more television sets (e.g., smart television sets or other television sets, or the like), and/or the like. In some cases, the user device 120 might include, without limitation, one of a laptop computer, a tablet computer, a smart phone, a mobile phone, a personal digital assistant, a remote control device, or a portable gaming device, and/or the like.

System 100 might further comprise one or more media (e.g., video, audio, or game) content sources or servers 135 and corresponding database(s) 140 that might communicatively couple to the media player 105 via one or more networks 145 (and, in some cases, via one or more telecommunications relay systems 150, which might include, without limitation, one or more wireless network interfaces (e.g., wireless modems, wireless access points, and the like), one or more towers, one or more satellites, and/or the like). The lightning bolt symbols are used to denote wireless communications between the one or more telecommunications relay systems 150 and the media player 105, between the one or more telecommunications relay systems 150 and each of at least one of the user devices 120, between the media player 105 and each of at least one of the display devices 115, between the media player 105 and each of at least one of the user devices 120, between the display device 115 and the user devices 120, between the media player 105 and each of the one or more audio playback devices 125a-125n, between the display device 115 and each of at least one of the one or more audio playback devices 125a-125n, between the user devices 120 and each of at least one of the one or more audio playback devices 125a-125n, and/or the like.

According to some embodiments, alternative or additional to the media player 105 and corresponding database(s) 110 being disposed within customer premises 130, system 100 might comprise remote computing system 155 and corresponding database(s)(s) 160 that communicatively couple with the one or more display devices 115 and/or with the one or more user devices 120 in the customer premises via the one or more networks 145 (and in some cases, via the one or more telecommunications relay systems 150). According to some embodiments, remote computing system 155 might comprise at least one of a server computer over a network, a cloud-based computing system over a network, and/or the like.

In operation, the media player 105 might receive an encoded video signal from media content source(s) 135 (and/or the database(s) 140 via the media content source(s) 135, or the like), might decode the received video signal, might establish a wireless communications link between the media player and the one or more display devices 115 via the integrated wireless video link system 105a, and might send the decoded video signal to the one or more display devices 115 (and/or one or more user devices 120) via the wireless communications link established by the integrated wireless video link system 105a.

According to some embodiments, sending the decoded video signal to the one or more display devices 115 via the wireless communications link established by the integrated wireless video link system 105a might comprise sending the decoded video signal to the one or more display devices 115, via the wireless communications link established by the integrated wireless video link system 105a, using a wireless video link protocol comprising at least one of WirelessHD protocol, Wireless Home Digital Interface ("WHDI") protocol, or Wireless Gigabit Alliance ("WiGig") protocol, and/or the like.

In some embodiments, the media player 105 might receive user input from a user. In some cases, at least one of decoding the received video signal, establishing the wireless communications link between the media player 105 and the one or more display devices 115 via the integrated wireless video link system 105a, or sending the decoded video signal to the one or more display devices 115 via the wireless communications link, and/or the like might be performed in response to receiving the user input. In some instances, the user input might include, without limitation, at least one of voice input via a voice interface device, remote control input via a remote controller, or user interface input via a user interface device that is integrated in the media player, and/or the like. According to some embodiments, the user input might be received from a user device 120, which includes, but is not limited to, one of a laptop computer, a tablet computer, a smart phone, a mobile phone, a personal digital assistant, a remote control device, or a portable gaming device, and/or the like.

The various embodiments provide a media player that integrates the functionalities of video tuning and wireless video communication within a single device, the various embodiments further providing the corresponding method and system. Further advantages of such an integrated single device include, without limitation, minimized set-up times for the media player. For example, a service provider is able to offer services to consumers both inside and outside its main serving areas, shipping customer premises equipment ("CPE"; e.g., set-top box, or the like)—which, in this case, is in the form of the media player—directly to a customer or user and enabling the customer to connect the media player to his or her TV(s) wirelessly, without restrictions associated with media player placement (e.g., near the TV(s), or in line of sight of the TV(s), etc.). In fact, the media player (which might have voice input capabilities, gesture control capabilities, and/or touch interface capabilities, or the like) might be positioned close to where the user might be seated rather than closer to where the display devices are located, or the like, to facilitate communication or interaction between the user and the media player. The customer or user is also relieved from the tedious task of figuring out how to connect cables between the media player and the TV(s), as the wireless only set-up precludes such steps. Further, technicians need not be sent out to install the media player in the customer's home or office because set-up can be handled wirelessly (and in some cases, remotely from a central office or the like, if at all necessary). Such embodiments differ from (and provide freedom of installation/set-up and operation, as well as improved presentation functionalities compared with) existing wireless video communications systems, which are separate from the media player and which require cable connections to the media player for a first component and cable connections to the display device(s) for a second component, or the like.

Figure 2:
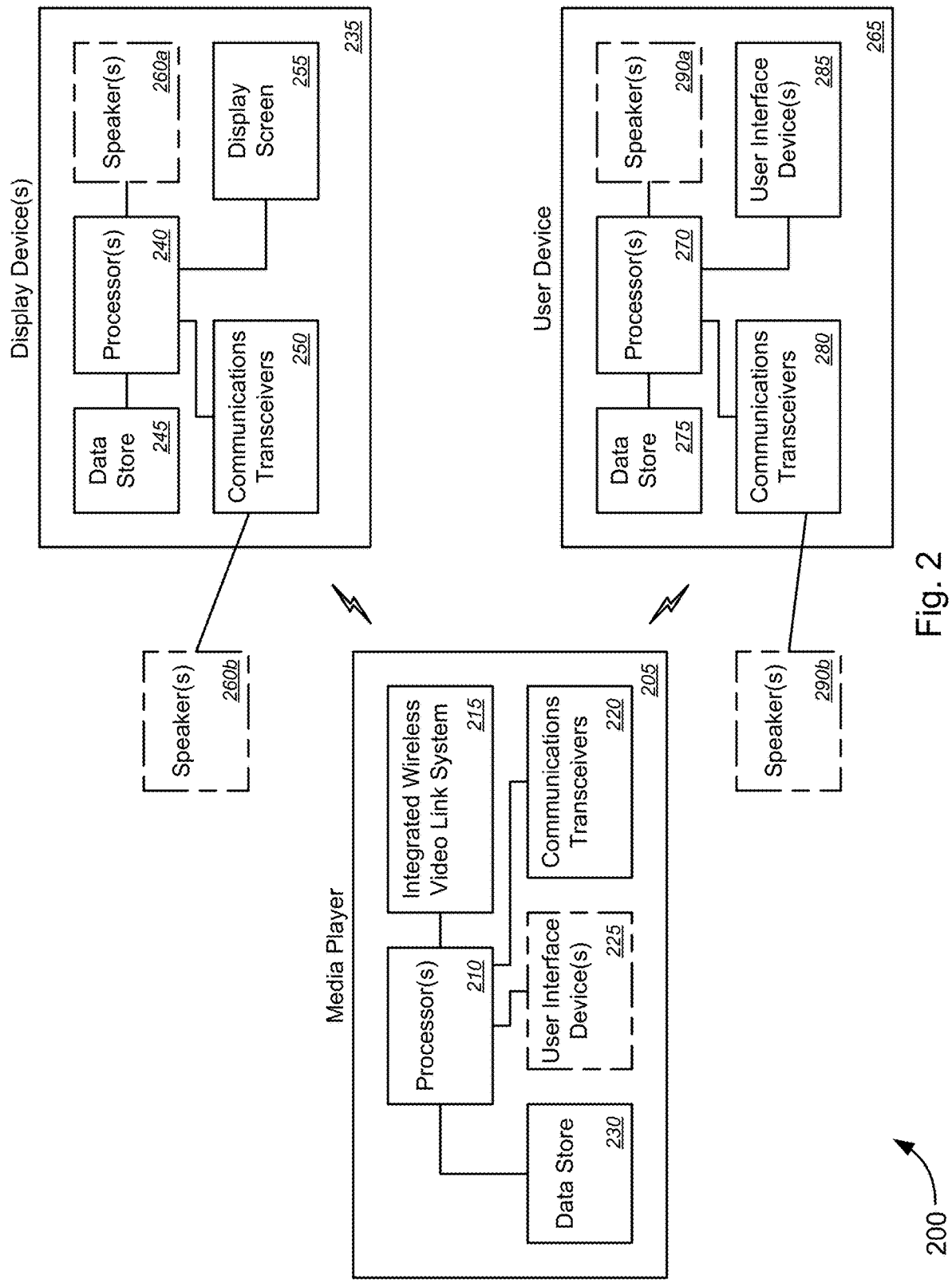
FIG. 2 is a schematic diagram illustrating another system for implementing video tuning and wireless video communication using a single device in which these functionalities are integrated, in accordance with various embodiments.

FIG. 2 is a schematic diagram illustrating another system 200 for implementing video tuning and wireless video communication using a single device in which these functionalities are integrated, in accordance with various embodiments.

In the non-limiting embodiment of FIG. 2, according to some embodiments, system 200 might comprise a media player 205 (which might correspond to media player 105 of system 100 of FIG. 1, or the like). Media player 205, in some cases, might comprise one or more processors 210, an integrated wireless video link system 215, one or more communications transceivers 220, one or more user interface device(s) 225 (optional), and one or more data stores or data storage devices 230, and/or the like. System 200 might further comprise one or more display devices 235 (which might correspond to the one or more display devices 115 of system 100 of FIG. 1, or the like), each of which might include, without limitation, one or more processors 240, one or more data stores 245, one or more communications transceivers 250, one or more display screens 255, and (optionally) one or more (built-in) speakers 260a, and/or the like. System 200 might further comprise one or more user devices 265 (which might correspond to the one or more user devices 120 of system 100 of FIG. 1, or the like), each of which might include, but are not limited to, one or more processors 270, one or more data stores 275, one or more communications transceivers 280, one or more user interface device(s) 285, and (optionally) one or more (built-in) speakers 290a, and/or the like.

In some embodiments, the one or more user interface device(s) 285 might include, but is not limited to, at least one of a touchscreen display(s) or touchscreen display device(s), one or more physical actuators (e.g., buttons, switches, toggles, etc.), one or more virtual actuators (e.g., touchscreen buttons, switches, toggles, slide-bars, etc.), one or more voice interface devices, a gesture interface device(s), a remote control interface device(s), and/or the like. In some cases, system 200 might further comprise one or more external speakers 260b (which might communicatively couple either wirelessly or in a wired manner with at least one of the display devices 235 (in some instances, via communications transceivers 250)) and one or more external speakers 290b (which might communicatively couple either wirelessly or in a wired manner with at least one of the user devices 265 (in some instances, via communications transceivers 280)), and/or the like. The media player 205 might communicatively couple (via wireless connection via integrated wireless video link system 215 and/or communications transceivers 220, or the like) with each of the display devices 235 (in some cases, via communications transceivers 250) and with each of the user devices 265 (in some cases, via communications transceivers 280).

The media player 205, the one or more display devices 235, the one or more user devices 265, and the one or more (internal) speakers 260a or 290b and the one or more (external) speakers 260b or 290b of system 200 in FIG. 2 are otherwise similar, if not identical, to the media player 105, the one or more display devices 115, the one or more user devices 120, and the one or more audio playback devices 125a-125n, respectively, of system 100 in FIG. 1, and the descriptions of these components of system 100 are applicable to the corresponding components of system 200, respectively.

Figure 3:
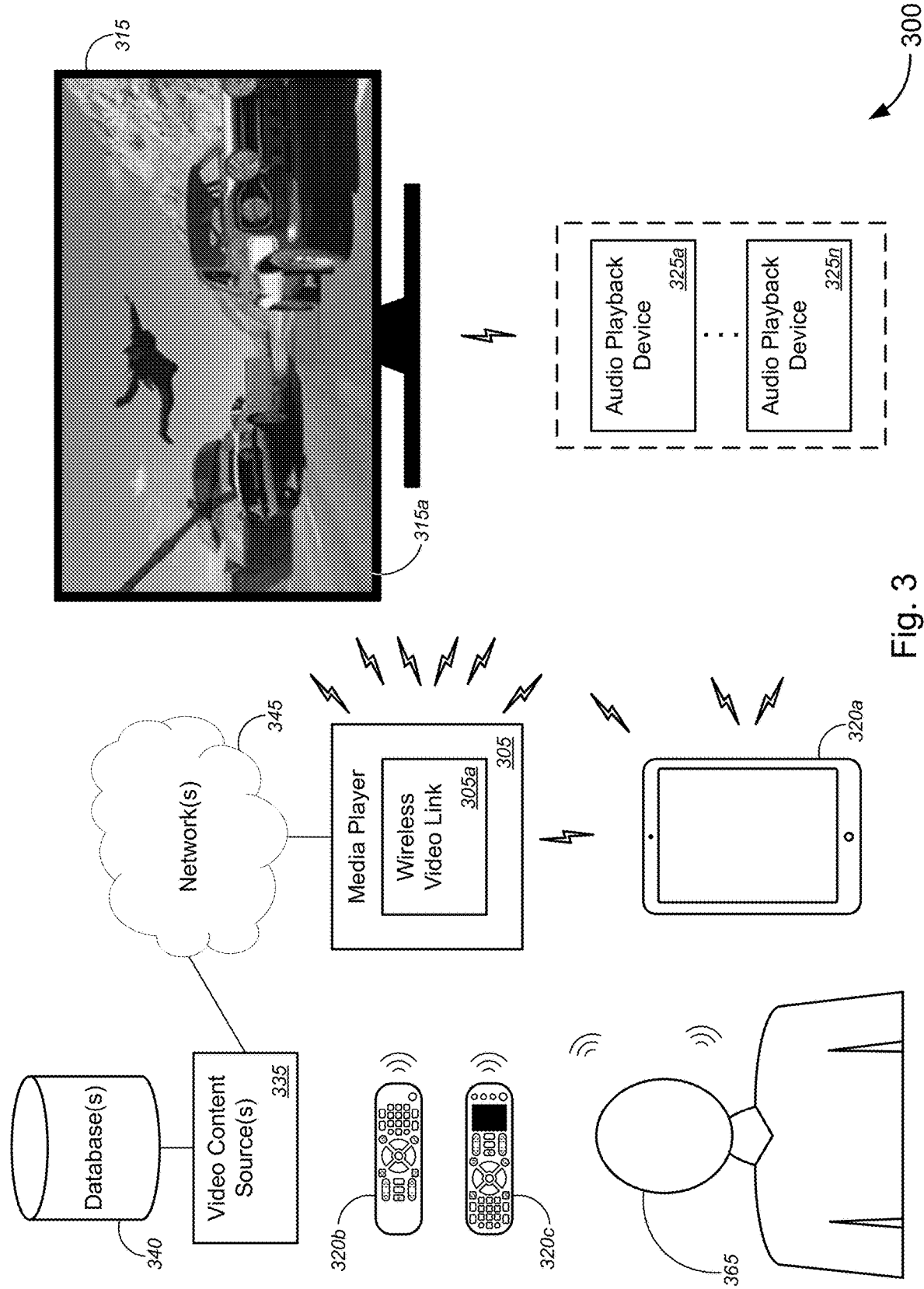
FIG. 3 is a schematic diagram illustrating yet another system for implementing video tuning and wireless video communication using a single device in which these functionalities are integrated, in accordance with various embodiments.

FIG. 3 is a schematic diagram illustrating yet another system 300 for implementing video tuning and wireless video communication using a single device in which these functionalities are integrated, in accordance with various embodiments.

In the non-limiting embodiment of FIG. 3, system 300 might comprise a media player 305, which might comprise an integrated wireless video link system 305a. System 300, according to some embodiments, might further comprise one or more display devices 315 (collectively, "display devices 315" or the like), which might each include a display screen(s) 315a, and one or more user devices 320 (collectively, "user devices 320" or the like), each of which might include a user interface device(s), and/or the like. In some aspects, the one or more user device 320 might include, without limitation, a tablet computer or smart phone 320a, a dedicated remote controller 320b, a universal remote controller 320c, and/or the like (collectively, "user devices 320" or the like). In some embodiments, the user interface device(s) might include, but is not limited to, at least one of a touchscreen display(s) or touchscreen display device(s), one or more physical actuators (e.g., buttons, switches, toggles, etc.), one or more virtual actuators (e.g., touchscreen buttons, switches, toggles, slide-bars, etc.), one or more voice interface devices, a gesture interface device(s), a remote control interface device(s), and/or the like. In some cases, system 300 might further, or optionally, comprise one or more audio playback devices 325a-325n (collectively, "audio playback devices 325" or "speakers 325" or the like), and/or the like.

The media player 305 might communicatively couple to each of the one or more display devices 315 and/or the one or more user devices 320 (and, in some cases, to one or more of the audio playback devices 325*a*-325*n*, or the like) via wireless connection, via the integrated wireless video link system 305*a*. Each of the one or more display devices 315 and/or the one or more user devices 320 might communicatively couple to one or more of the audio playback devices 325*a*-325*n*, and/or to each other, either via wireless connection and/or via wired connection. The one or more user devices 320 might each receive user input from a user 365 (in various embodiments, receiving touch input from the user via a touchscreen display (e.g., touchscreen display of a tablet device, a smart phone, a laptop computer, or the like); in some embodiments, receiving voice input from the user via a voice interface device (in the user device 320 or the media player 305, or the like); in some instances, receiving gesture input from the user via a gesture interface device (in the user device 320 or the media player 305, or the like); in some cases, receiving physical user input from the user via one or more physical actuators (e.g., buttons, switches, and/or the like), or the like (in the user device 320 or the media player 305, or the like); according to some embodiments, receiving remote control input via a remote control interface device of a remote controller 320*b* or 320*c*; etc.), and might each relay the user input to the media player 305, according to some embodiments.

System 300 might further comprise one or more media (e.g., video, audio, or game) content sources or servers 335 and corresponding database(s) 340 that might communicatively couple to the media player 305 via one or more networks 345. The lightning bolt symbols are used to denote wireless communications between the media player 305 and each of at least one of the display devices 315, between the media player 305 and each of at least one of the user devices 320*a*-320*c*, between the display device 315 and the user devices 320*a*-320*c*, between the media player 305 and each of the one or more audio playback devices 325*a*-325*n*, between the display device 315 and each of at least one of the one or more audio playback devices 325*a*-325*n*, between the user devices 320 and each of at least one of the one or more audio playback devices 325*a*-325*n*, and/or the like. Similarly, the wave-like symbols are used to denote voice communications, infrared ("IR"), or other electromagnetic or wireless communications, and/or the like.

The media player 305, the one or more display devices 315, the one or more user devices 320*a*-320*c*, the one or more audio playback devices 325*a*-325*n*, video content source(s) 335, database(s) 340, and network 345 of system 200 in FIG. 2 are otherwise similar, if not identical, to the media player 105, the one or more display devices 115, the one or more user devices 120, the one or more audio playback devices 125*a*-125*n*, video content source(s) 135, database(s) 140, and network 145, respectively, of system 100 in FIG. 1, and the descriptions of these components of system 100 are applicable to the corresponding components of system 200, respectively.

Figure 4:
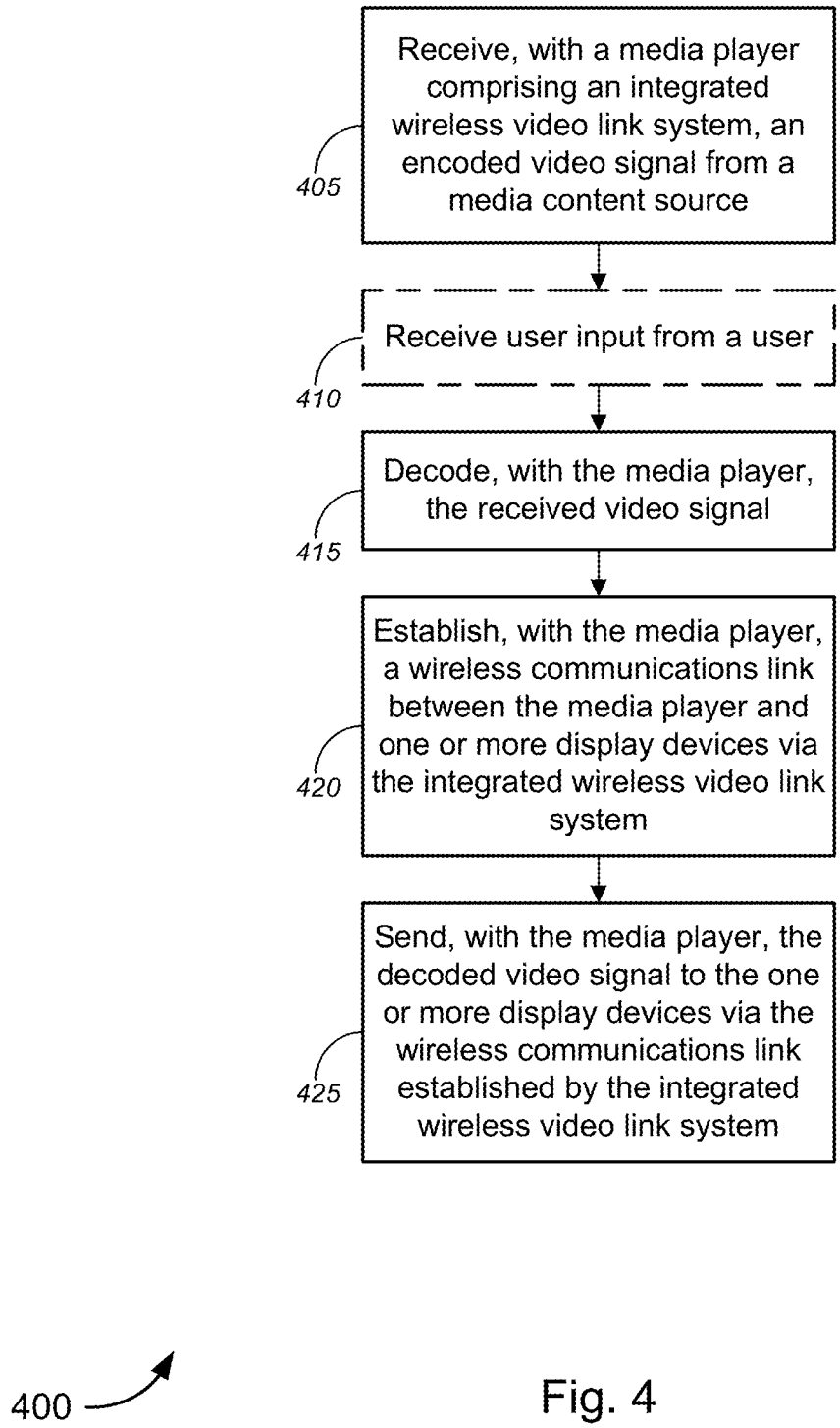
FIG. 4 is a flow diagram illustrating a method for implementing video tuning and wireless video communication using a single device in which these functionalities are integrated, in accordance with various embodiments.

FIG. 4 is a flow diagram illustrating a method 400 for implementing video tuning and wireless video communication using a single device in which these functionalities are integrated, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems 100, 200, and 300 of FIGS. 1, 2, and 3, respectively (or components thereof), such methods may also be implemented using any suitable hardware (or software) implementation. Similarly, while each of the systems 100, 200, and 300 of FIGS. 1, 2, and 3, respectively (or components thereof), can operate according to the method 400 illustrated by FIG. 4 (e.g., by executing instructions embodied on a computer readable medium), the systems 100, 200, and 300 of FIGS. 1, 2, and 3 can each also operate according to other modes of operation and/or perform other suitable procedures.

In the non-limiting embodiment of FIG. 4A, method 400, at block 405, might comprise receiving, with a media player comprising an integrated wireless video link system, an encoded video signal from a media content source. In some embodiments, the media player might include, without limitation, one of a set-top box ("STB"), a digital video recording ("DVR") device, a user device, a server computer over a network, a cloud-based computing system over a network, or a gaming console, and/or the like.

At optional block 410, method 400 might comprise receiving user input from a user. In some instances, the user input might include, without limitation, at least one of voice input via a voice interface device, remote control input via a remote controller, or user interface input via a user interface device that is integrated in the media player, and/or the like. According to some embodiments, the user input might be received from a user device, which includes, but is not limited to, one of a laptop computer, a tablet computer, a smart phone, a mobile phone, a personal digital assistant, a remote control device, or a portable gaming device, and/or the like.

Method 400 might further comprise decoding, with the media player, the received video signal (block 415). In some embodiments, decoding the received video signal might comprise decoding, with the media player, the received video signal in response to receiving the user input (or in response to the received user input).

Method 400 might further comprise, at block 420, establishing, with the media player, a wireless communications link between the media player and one or more display devices via the integrated wireless video link system. Merely by way of example, in some instances, the one or more display devices each comprises one of a television set, a smart television, a video projection system, a computer monitor, or a laptop monitor, and/or the like. In some cases, establishing the wireless communications link between the media player and the one or more display devices via the integrated wireless video link system might comprise establishing, with the media player, a wireless communications link between the media player and one or more display devices via the integrated wireless video link system in response to receiving the user input (or in response to the received user input). In some embodiments, establishing a wireless communications link between the media player and one or more display devices via the integrated wireless video link system might comprise establishing, with the media player, a secure wireless communications link between the media player and one or more display devices via the integrated wireless video link system, the secure wireless communications link allowing only the one or more display devices to receive the decoded video signal At block 425, method 400 might comprise sending, with the media player, the decoded video signal to the one or more display devices via the wireless communications link established by the integrated wireless video link system. In some instances, sending the decoded video signal to the one or more display devices might comprise sending, with the media player, the decoded video signal to the one or more display devices via the wireless communications link established by the integrated wireless video link system, in response to receiving the user input (or in response to the received user input). According to some embodiments, sending the decoded video signal to the one or more display devices via the wireless communications link established by the integrated wireless video link system might comprises sending, with the media player, the decoded video signal to the one or more display devices, via the wireless communications link established by the integrated wireless video link system, using a wireless video link protocol comprising at least one of WirelessHD protocol, Wireless Home Digital Interface ("WHDI") protocol, or Wireless Gigabit Alliance ("WiGig") protocol, and/or the like.

Exemplary System and Hardware Implementation

Figure 5:
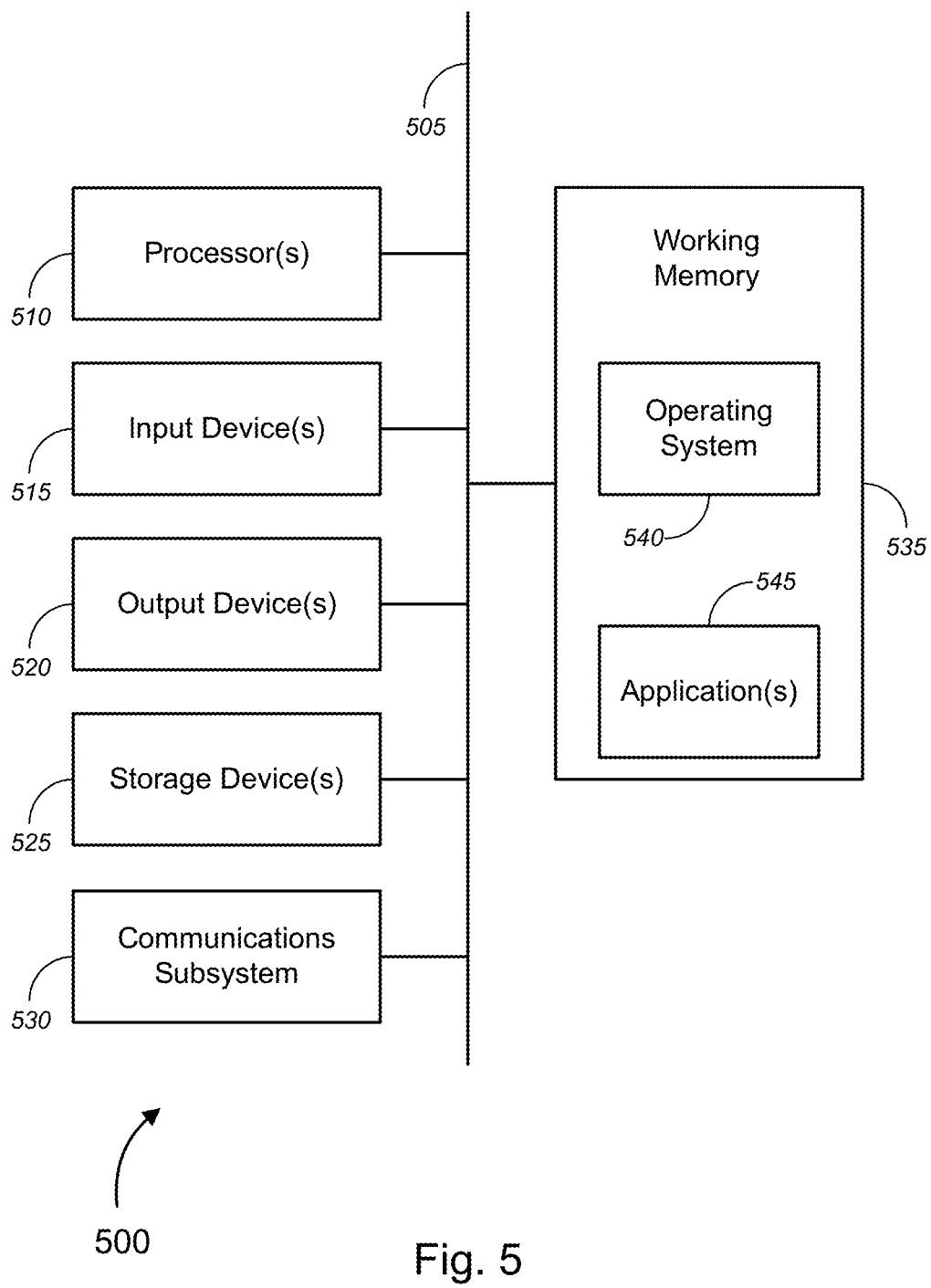
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., media players 105, 205, and 305, display devices 115, 235, and 315, user devices 120, 265, and 320a-320c, audio playback devices 125a-125n, 260a, 260b, 290a, 290b, and 325a-325n, video content sources (or servers) 135 and 335, computing systems 155, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., media players 105, 205, and 305, display devices 115, 235, and 315, user devices 120, 265, and 320a-320c, audio playback devices 125a-125n, 260a, 260b, 290a, 290b, and 325a-325n, video content sources (or servers) 135 and 335, computing systems 155, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. In some aspects, the communications subsystem 530 might also comprise a wireless video link system, which might utilize a wireless video link protocol comprising at least one of WirelessHD protocol, Wireless Home Digital Interface ("WHDI") protocol, or Wireless Gigabit Alliance ("WiGig") protocol, and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention.

According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
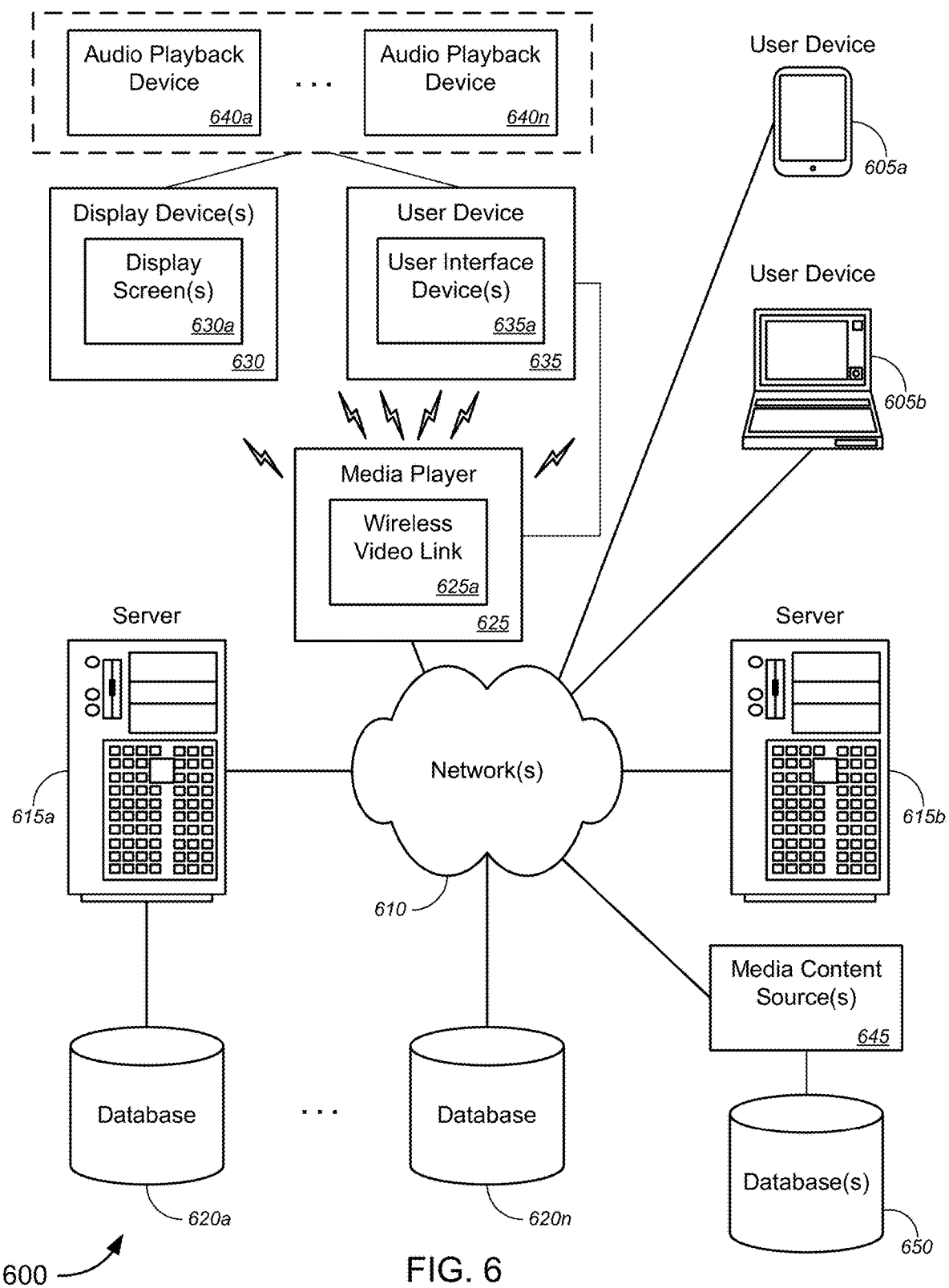
FIG. 6 is a block diagram illustrating a networked system of computers, computing systems, or system hardware architecture, which can be used in accordance with various embodiments.

As noted above, a set of embodiments comprises methods and systems for implementing media content streaming or playback, and, more particularly, to methods, systems, and apparatuses for implementing video tuning and wireless video communication using a single device in which these functionalities are integrated. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 145 FIG. 1, or the like) can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C #™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing media content streaming or playback, and, more particularly, to methods, systems, and apparatuses for implementing video tuning and wireless video communication using a single device in which these functionalities are integrated, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a media player 625 with an integrated wireless video link system 625a (similar to media players 105, 205, and 305 of FIGS. 1-3, or the like), one or more display devices 630 each with display screen(s) 630a (similar to display devices 115, 235, and 315 of FIGS. 1-3, or the like), one or more user devices 635 each with user interface device(s) 635a (similar to user devices 120, 265, and 320a-320c of FIGS. 1-3, or the like), one or more audio playback devices 640a-640n (similar to audio playback devices 125a-125n, 260a, 260b, 290a, 290b, and 325a-325n of FIGS. 1-3, or the like), one or more media (e.g., video) content sources 645 and corresponding database(s) 650 (similar to media or video content sources (or servers) 135 and corresponding databases 140 of FIG. 1, or the like), and/or the like. In some embodiments, the media player 625 might comprise a media device that is communicatively coupled to a playback device(s) (i.e., one or more of display device(s) 630, the user device(s) 605 or 635, and/or audio playback device(s) 640a-640n, or the like). In some cases, the media device might comprise one of a set-top box ("STB"), a media player, a gaming console, a server computer, a desktop computer, or a laptop computer, and/or the like. The media player might comprise one of a digital versatile disc or digital video disc ("DVD") player, a Blu-ray disc ("BD") player, a digital video recording ("DVR") device, a streaming video player, a streaming music player, or a streaming game player, and/or the like, while the playback device might comprise at least one of one or more monitors, one or more television sets, or one or more speakers, and/or the like.

In operation, the media player 625 might receive an encoded video signal from media content source(s) 645 (and/or the database(s) 650 via the media content source(s) 645, or the like), might decode the received video signal, might establish a wireless communications link between the media player and the one or more display devices 630 via the integrated wireless video link system 625a, and might send the decoded video signal to the one or more display devices 630 (and/or one or more user devices 635) via the wireless communications link established by the integrated wireless video link system 625a.

According to some embodiments, sending the decoded video signal to the one or more display devices 630 via the wireless communications link established by the integrated wireless video link system 625a might comprise sending the decoded video signal to the one or more display devices 630, via the wireless communications link established by the integrated wireless video link system 625a, using a wireless video link protocol comprising at least one of WirelessHD protocol, Wireless Home Digital Interface ("WHDI") protocol, or Wireless Gigabit Alliance ("WiGig") protocol, and/or the like.

In some embodiments, the media player 625 might receive user input from a user. In some cases, at least one of decoding the received video signal, establishing the wireless communications link between the media player 625 and the one or more display devices 630 via the integrated wireless video link system 625a, or sending the decoded video signal to the one or more display devices 630 via the wireless communications link, and/or the like might be performed in response to receiving the user input. In some instances, the user input might include, without limitation, at least one of voice input via a voice interface device, remote control input via a remote controller, or user interface input via a user interface device that is integrated in the media player, and/or the like. According to some embodiments, the user input might be received from a user device 605 or 635, which includes, but is not limited to, one of a laptop computer, a tablet computer, a smart phone, a mobile phone, a personal digital assistant, a remote control device, or a portable gaming device, and/or the like.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
receiving, with a media player, user input from a user;
receiving, with the media player comprising an integrated wireless video link system, an encoded video signal from a media content source;
decoding, with the media player, the received video signal;
establishing, with the media player, a wireless communications link between the media player and one or more display devices via the integrated wireless video link system, wherein establishing the wireless communications link between the media player and the one or more display devices via the integrated wireless video link system comprises establishing, with the media player, a secure wireless communications link between the media player and the one or more display devices via the integrated wireless video link system, the secure wireless communications link allowing only the one or more display devices to receive the decoded video signal from the media player, wherein establishing the decoded video signal to the one or more display devices via the wireless communications link is performed in response to receiving the user input, and wherein the media player is separate from the one or more display device; and
sending, with the media player, the decoded video signal to the one or more display devices via the wireless communications link established by the integrated wireless video link system, wherein sending the decoded video signal to the one or more display devices via the wireless communications link is performed in response to receiving the user input.

2. The method of claim 1, wherein sending the decoded video signal to the one or more display devices via the wireless communications link established by the integrated wireless video link system comprises sending, with the media player, the decoded video signal to the one or more display devices, via the wireless communications link established by the integrated wireless video link system, using a wireless video link protocol comprising at least one of WirelessHD protocol, Wireless Home Digital Interface ("WHDI") protocol, or Wireless Gigabit Alliance ("WiGig") protocol.

3. The method of claim 1, wherein the media player comprises one of a set-top box ("STB"), a digital video recording ("DVR") device, a user device, a server computer over a network, a cloud-based computing system over a network, or a gaming console.

4. The method of claim 1, wherein the one or more display devices each comprises one of a television set, a smart television, a video projection system, a computer monitor, or a laptop monitor.

5. The method of claim 1, wherein decoding the received video signal is performed in response to receiving the user input.

6. The method of claim 1, wherein the user input comprises at least one of voice input via a voice interface device, remote control input via a remote controller, or user interface input via a user interface device that is integrated in the media player.

7. The method of claim 1, wherein the user input is received from a user device comprising one of a laptop computer, a tablet computer, a smart phone, a mobile phone, a personal digital assistant, a remote control device, or a portable gaming device.

8. A media player, comprising:
an integrated wireless video link system;
at least one processor; and
a non-transitory computer readable medium communicatively coupled to the at least one processor, the non-transitory computer readable medium having stored thereon computer software comprising a set of instructions that, when executed by the at least one processor, causes the media player to:
receive, with the integrated wireless video link system, an encoded video signal from a media content source;
decode the received video signal;
establish a wireless communications link between the media player and one or more display devices via the integrated wireless video link system, wherein establishing the wireless communications link between the media player and the one or more display devices via the integrated wireless video link system comprises establishing, with the media player, a secure wireless communications link between the media player and the one or more display devices via the integrated wireless video link system, the secure wireless communications link allowing only the one or more display devices to receive the decoded video signal from the media player, wherein establishing the decoded video signal to the one or more display devices via the wireless communications link is performed in response to receiving the user input, and wherein the media player is separate from the one or more display device; and
send the decoded video signal to the one or more display devices via the wireless communications link established by the integrated wireless video link system, wherein sending the decoded video signal to the one or more display devices via the wireless communications link is performed in response to receiving the user input.

9. The media player of claim 8, wherein sending the decoded video signal to the one or more display devices via the wireless communications link established by the integrated wireless video link system comprises sending the decoded video signal to the one or more display devices, via the wireless communications link established by the integrated wireless video link system, using a wireless video link protocol comprising at least one of WirelessHD protocol, Wireless Home Digital Interface ("WHDI") protocol, or Wireless Gigabit Alliance ("WiGig") protocol.

10. The media player of claim 8, wherein the media player comprises one of a set-top box, a digital video recording ("DVR") device, a user device, a server computer over a network, a cloud-based computing system over a network, or a gaming console.

11. The media player of claim 8, wherein the one or more display devices each comprises one of a television set, a smart television, a video projection system, a computer monitor, or a laptop monitor.

12. The media player of claim 8, wherein decoding the received video signal is performed in response to receiving the user input.

13. The media player of claim 8, wherein the user input comprises at least one of voice input via a voice interface device, remote control input via a remote controller, or user interface input via the user interface device that is integrated in the media player.

14. The media player of claim 8, wherein the user input is received from a user device comprising one of a laptop computer, a tablet computer, a smart phone, a mobile phone, a personal digital assistant, a remote control device, or a portable gaming device.

15. A system, comprising:
a media player, comprising:
an integrated wireless video link system;
at least one first processor; and
a first non-transitory computer readable medium communicatively coupled to the at least one first processor, the first non-transitory computer readable medium having stored thereon computer software comprising a first set of instructions that, when executed by the at least one first processor, causes the media player to:
receive user input from a user;
receive, with the integrated wireless video link system, an encoded video signal from a media content source;
decode the received video signal;
establish a wireless communications link between the media player and one or more display devices via the integrated wireless video link system, wherein establishing the wireless communications link between the media player and the one or more display devices via the integrated wireless video link system comprises establishing, with the media player, a secure wireless communications link between the media player and the one or more display devices via the integrated wireless video link system, the secure wireless communications link allowing only the one or more display devices to receive the decoded video signal from the media player, wherein establishing the decoded video signal to the one or more display devices via the wireless communications link is performed in response to receiving the user input, and wherein the media player is separate from the one or more display device; and
send the decoded video signal to the one or more display devices via the wireless communications link established by the integrated wireless video link system, wherein sending the decoded video signal to the one or more display devices via the wireless communications link is performed in response to receiving the user input; and
the one or more display devices, each comprising:
a first wireless communications system;
one or more display screens;
at least one second processor; and
a second non-transitory computer readable medium communicatively coupled to the at least one second processor, the second non-transitory computer readable medium having stored thereon computer software comprising a second set of instructions that, when executed by the at least one second processor, causes the display device to:
receive, via the first wireless communications system, the decoded video signal sent from the media player; and
display, on the one or more display screens, the received and decoded video signal.

16. The system of claim 15, wherein the media player comprises one of a set-top box, a digital video recording ("DVR") device, a user device, a server computer over a network, a cloud-based computing system over a network, or a gaming console.

17. The system of claim 15, wherein the one or more display devices each comprises one of a television set, a smart television, a video projection system, a computer monitor, or a laptop monitor.

18. The system of claim 15, further comprising:
   a user device, comprising:
      a second wireless communications system;
      a user interface device;
      at least one third processor; and
      a third non-transitory computer readable medium communicatively coupled to the at least one third processor, the third non-transitory computer readable medium having stored thereon computer software comprising a third set of instructions that, when executed by the at least one third processor, causes the user device to:
         receive, via the user interface device, user input from a user;
         generate one or more command instructions based on the received user input; and
         send, via the second wireless communications system, the generated one or more command instructions to the media player.

19. The system of claim 18, wherein the user device comprises one of a laptop computer, a tablet computer, a smart phone, a mobile phone, a personal digital assistant, a remote control device, or a portable gaming device.

* * * * *